(No Model.)
P. WAAGE.
PROCESS OF MAKING FISH MEAL.
No. 518,748. Patented Apr. 24, 1894.
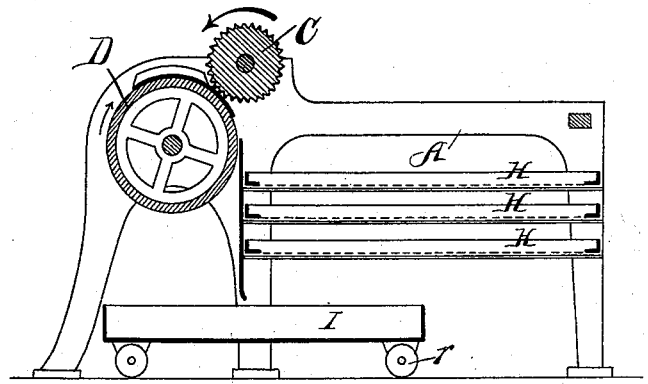
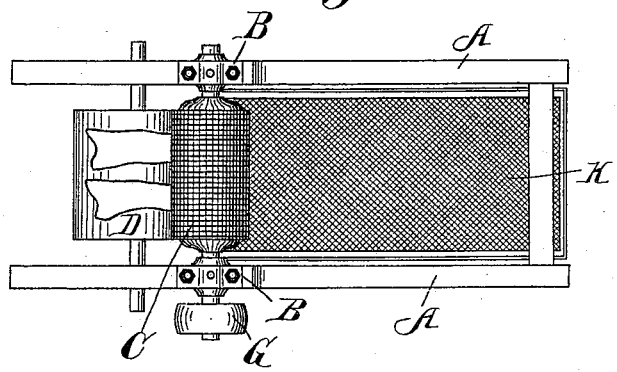
Witnesses:
H. J. Wieterich
M. J. L. Higgins
Inventor:
Peter Waage
By Henry Orth
Atty

UNITED STATES PATENT OFFICE.

PETER WAAGE, OF CHRISTIANIA, NORWAY, ASSIGNOR TO THE AKTIESELSKABET NORSK FISKEMEL COMPANY, OF SAME PLACE.

PROCESS OF MAKING FISH MEAL.

SPECIFICATION forming part of Letters Patent No. 518,748, dated April 24, 1894.

Application filed June 18, 1892. Serial No. 437,199. (No specimens.)

*To all whom it may concern:*

Be it known that I, PETER WAAGE, a subject of the King of Sweden and Norway, residing at Christiania, in the county of Christiania, Kingdom of Norway, have invented certain new and useful Improvements in Methods of Manufacturing Fish Powder; and I do declare the following to be a full, clear, and exact description of the invention, such as will enable others skilled in the art to which it appertains to make and use the same, reference being had to the accompanying drawings, and to the letters of reference marked thereon, which form a part of this specification.

As is well known, the presence of water is an absolutely necessary condition for the life or development of the bacteria of putrefaction. For this reason several of the methods employed for preserving food products are based upon the extraction of water from such products, that is to say, the products are submitted to a drying process. It is however only in some few cases that the natural products may be submitted to a direct drying. If the drying operation is to be performed in so rapid a manner as to avoid putrefaction, it is generally necessary to increase the surface of the product to be dried, in order to accomplish the evaporation of the water in a sufficiently short time. This end is attained in various ways, as for instance, in the manufacture of meat powder, the meat is cut into small pieces before it is dried, and in the preservation of vegetables these are sometimes subjected to pressure before drying. None of these methods, however, are applicable to the treatment of fish, as more or less of the skin is liable to be carried with the flesh and is mixed therewith, imparting to the product an unpalatable taste and an unpleasant appearance. To avoid this it has been proposed to first remove the skin and then grind the flesh before drying it; but this method is not practical, because during the grinding of the flesh it will be rendered more or less pasty and will become more or less adhesive and compressed, in which condition it is difficult to dry the same, while this mode of treatment is also very expensive.

My invention has for its object the provision of means whereby these difficulties are effectually obviated and the fish prepared for drying without first removing the skin.

According to my invention the previously cleaned fish without heads is divided longitudinally, boned, and the flesh subjected to the action of a toothed or serrated roller revolving at a high speed, the fish being presented to the action of the roller in such manner that the skin of the fish will not be acted upon by said roller. But that my invention may be fully understood, I will describe the same in detail, reference being had to the accompanying drawings, in which—

Figure 1 is a longitudinal vertical section of an apparatus for disintegrating the flesh of fish, and Fig. 2 is a top plan view thereof.

A, indicates the frame of the machine in the upper end portion of which are provided the bearings B for the toothed or serrated roller, C, below and to the left of roller C, said frame is provided with bearings for a drum D, on which the halves of the boned fish are laid, skin downward. The shaft or one of the journals of roller C, carries a belt pulley, G, driven at a rapid rate from any suitable motor to revolve the roller in the direction of the arrow, Fig. 1, the drum D, being revolved in an opposite direction as indicated by arrow. The roller C may be made adjustable in its bearings toward and from the drum D, but I preferably make the latter adjustable toward and from the roller C by any well known means, the distance between the two rollers depending upon the thickness of the skin of the fish, but generally speaking will not exceed one sixteenth of an inch or about that of the skin of fish generally used for the purpose of converting it into fish powder.

As the flesh side of the halves of fish is presented to the action of the roller, the skin thereof will adhere to the drum while the flesh will be removed by the roller C and drawn into a receiver H provided with a perforated bottom, while the skin revolving with the drum will drop into the wheeled receiver I. Practical experience has shown that about fifteen hundred pounds of fish can be disintegrated and skinned and the skin separated from the disintegrated flesh per hour.

When a suitable quantity of the disintegrated flesh of fish has accumulated in receiver H, the same is removed to a drying chamber and exposed to a strong or powerful draft of air which is heated to a temperature not exceeding 120° Fahrenheit.

Hitherto the desiccation of the disintegrated flesh of fish has been effected at high temperatures, but this is objectionable for the reason that the albuminous constituents of the flesh become coagulated and the product is then not suited for general culinary purposes.

After the shredded or disintegrated flesh of fish has been thoroughly dried it is ground to a coarse powder, which latter is again dried, reground, and graded by means of sieves, the finer powder constituting the final product.

The object of reducing the flesh to a pulverulent form is to render its thorough desiccation possible, and also for the purpose of increasing the scope of usefulness thereof, as for instance, it is not possible to prepare a palatable fish soup from coarsely disintegrated or shredded fish, while a most delicious soup can be prepared from the pulverized flesh.

The product prepared according to my invention differs not only in appearance but in taste and quality from all such products heretofore placed on the market.

Having thus described my invention, what I claim as new therein, and desire to secure by Letters Patent, is—

The mode of treating fish, which consists in dividing the same longitudinally, removing the bones, then removing the flesh and at the same time disintegrating or shredding the same and leaving the skin intact, by presenting the flesh side of the divided fish to the action of a rapidly revolving disintegrating device as a toothed or serrated roller, drying the disintegrated or shredded flesh by exposure to a strong draft of air, then grinding the dry, disintegrated flesh to a coarse powder, exposing the coarse powder again to the action of a strong draft of warm air, and regrinding to a fine powder, for the purpose set forth.

In testimony whereof I affix my signature in presence of two witnesses.

PETER WAAGE.

Witnesses:
HERMAN G. GADE,
OSCAR WINGE.